US012665139B2

(12) United States Patent
Wittkopf et al.

(10) Patent No.: US 12,665,139 B2
(45) Date of Patent: Jun. 23, 2026

(54) THREE-DIMENSIONAL PRINTED CAPACITORS

(71) Applicant: Peridot Print LLC, Palo Alto, CA (US)

(72) Inventors: Jarrid Wittkopf, Palo Alto, CA (US); Kristopher J. Erickson, Palo Alto, CA (US); Eric Luna-Ramirez, Palo Alto, CA (US); James W. Stasiak, Palo Alto, CA (US)

(73) Assignee: Peridot Print LLC, Palo Alto, CA (US)

( * ) Notice: Subject to any disclaimer, the term of this patent is extended or adjusted under 35 U.S.C. 154(b) by 167 days.

(21) Appl. No.: 17/917,968

(22) PCT Filed: Apr. 20, 2020

(86) PCT No.: PCT/US2020/028927
§ 371 (c)(1),
(2) Date: Oct. 10, 2022

(87) PCT Pub. No.: WO2021/216033
PCT Pub. Date: Oct. 28, 2021

(65) Prior Publication Data
US 2023/0130339 A1 Apr. 27, 2023

(51) Int. Cl.
*H01G 13/00* (2013.01)
*B29C 64/165* (2017.01)
(Continued)

(52) U.S. Cl.
CPC ........... *H01G 13/00* (2013.01); *B29C 64/165* (2017.08); *B29C 64/393* (2017.08); *B33Y 10/00* (2014.12);
(Continued)

(58) Field of Classification Search
CPC ..... B29C 64/165; B29C 64/393; B33Y 10/00; B33Y 30/00; B33Y 50/02; B33Y 80/00; H01G 13/00
See application file for complete search history.

(56) References Cited

U.S. PATENT DOCUMENTS

| | | | |
|---|---|---|---|
| 8,083,920 | B2 | 12/2011 | Yoshimitsu |
| 2017/0136707 | A1 | 5/2017 | Batchelder et al. |

(Continued)

FOREIGN PATENT DOCUMENTS

| | | |
|---|---|---|
| CN | 103762093 B | 3/2015 |
| CN | 107206668 A | 9/2017 |

(Continued)

OTHER PUBLICATIONS

Chung et al, Appl. Phys. Lett. 94, 072903 2009 (Year: 2009).*

*Primary Examiner* — Yunju Kim
(74) *Attorney, Agent, or Firm* — Michael Dryja

(57) ABSTRACT

In one example in accordance with the present disclosure, an additive manufacturing system is described. The additive manufacturing system includes an additive manufacturing device to form a three-dimensional (3D) printed object. The additive manufacturing system also includes a controller to form a 3D printed capacitor on a body of the 3D printed object. The controller does this by controlling deposition of a conductive agent to form electrodes of the 3D printed capacitor and by controlling deposition of a dielectric agent in a dielectric region between the electrodes of the 3D printed capacitor.

20 Claims, 12 Drawing Sheets

(51) Int. Cl.

| | | |
|---|---|---|
| *B29C 64/393* | (2017.01) | |
| *B29L 31/34* | (2006.01) | |
| *B33Y 10/00* | (2015.01) | |
| *B33Y 30/00* | (2015.01) | |
| *B33Y 50/02* | (2015.01) | |
| *B33Y 80/00* | (2015.01) | |

(52) U.S. Cl.

CPC .............. *B33Y 30/00* (2014.12); *B33Y 50/02*
(2014.12); *B33Y 80/00* (2014.12); *B29L*
*2031/3406* (2013.01)

(56) References Cited

U.S. PATENT DOCUMENTS

| | | | |
|---|---|---|---|
| 2017/0221648 A1* | 8/2017 | Rolin | .................... H01G 11/84 |
| 2017/0334139 A1 | 11/2017 | Ammi | |
| 2017/0346129 A1 | 11/2017 | Stolyarov et al. | |
| 2018/0001550 A1* | 1/2018 | Zhao | .................... B29C 64/153 |
| 2018/0141274 A1 | 5/2018 | Fink et al. | |
| 2019/0217529 A1 | 7/2019 | Ammi et al. | |
| 2019/0333716 A1 | 10/2019 | Yoo et al. | |

FOREIGN PATENT DOCUMENTS

| | | |
|---|---|---|
| CN | 104505265 B | 3/2018 |
| CN | 109049674 A | 12/2018 |
| CN | 109562562 A | 4/2019 |
| KR | 10-1730704 B1 | 4/2017 |
| WO | 2019/078813 A1 | 4/2019 |

* cited by examiner

Additive Manufacturing System
100

Additive Manufacturing Device
102

Controller
104

START

Sequentially form slices of a
3D printed object
601

Deposit a conductive agent
to form electrodes of a 3D
printed capacitor formed in
the body of the 3D printed
object
602

Form a dielectric region
between the electrodes of
the 3D printed capacitor
603

END

700

| Machine-Readable Storage Medium | 924 |
|---|---|
| 926 | Determine Instructions |
| 928 | Calculate Instructions |
| 930 | Pass Instructions |

Fig. 9

THREE-DIMENSIONAL PRINTED CAPACITORS

BACKGROUND

Additive manufacturing systems produce three-dimensional (3D) objects by building up layers of material. Some additive manufacturing systems are referred to as "3D printing devices" and use inkjet or other printing technology to apply some of the manufacturing materials. 3D printing devices and other additive manufacturing devices make it possible to convert a computer-aided design (CAD) model or other digital representation of an object directly into the physical object.

BRIEF DESCRIPTION OF THE DRAWINGS

The accompanying drawings illustrate various examples of the principles described herein and are part of the specification. The illustrated examples are given merely for illustration, and do not limit the scope of the claims.

FIG. 1 is a block diagram of an additive manufacturing system for forming 3D printed capacitors, according to an example of the principles described herein.

FIG. 9 depicts a non-transitory machine-readable storage medium for forming 3D printed capacitors, according to an example of the principles described herein.

Figure 2:
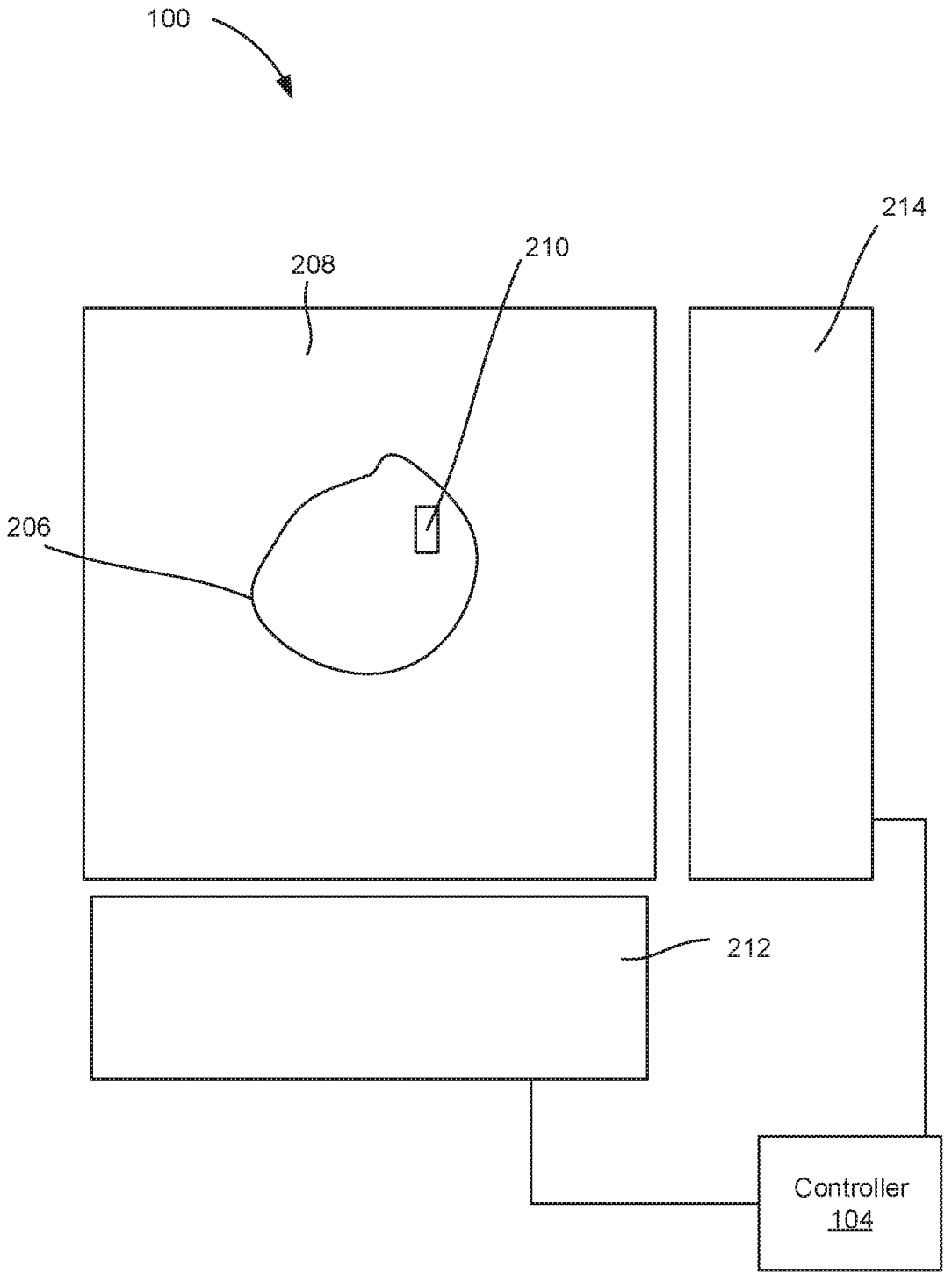
FIG. 2 is a simplified top view of an additive manufacturing system for forming 3D printed capacitors, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Additive manufacturing systems form a three-dimensional (3D) object through the solidification of layers of build material. Additive manufacturing systems make objects based on data in a 3D model of the object generated, for example, with a computer-aided drafting (CAD) computer program product. The model data is processed into slices, each slice defining portions of a layer of build material that are to be solidified.

In one example, to form the 3D object, a build material, which may be powder, is deposited on a bed. A fusing agent is then dispensed onto portions of a layer of build material that are to be fused to form a layer of the 3D object. The system that carries out this type of additive manufacturing may be referred to as a powder and fusing agent-based system. The fusing agent disposed in the desired pattern increases the energy absorption of the layer of build material on which the agent is disposed. The build material is then exposed to energy such as electromagnetic radiation. The electromagnetic radiation may include infrared light, ultraviolet light, laser light, or other suitable electromagnetic radiation. Due to the increased heat absorption properties imparted by the fusing agent, those portions of the build material that have the fusing agent disposed thereon heat to a temperature greater than the fusing temperature for the build material.

Accordingly, as energy is applied to a surface of the build material, the build material that has received the fusing agent, and therefore has increased energy absorption characteristics, fuses while that portion of the build material that has not received the fusing agent remains in powder form. Those portions of the build material that receive the agent and thus have increased heat absorption properties may be referred to as fused portions. By comparison, the applied heat is not so great so as to increase the heat of the portions of the build material that are free of the agent to this fusing temperature. Those portions of the build material that do not receive the agent and thus do not have increased heat absorption properties may be referred to as unfused portions.

Accordingly, a predetermined amount of heat is applied to an entire bed of build material, the portions of the build material that receive the fusing agent, due to the increased heat absorption properties imparted by the fusing agent, fuse and form the object while the unfused portions of the build material are unaffected, i.e., not fused, in the presence of such application of thermal energy. This process is repeated in a layer-wise fashion to generate a 3D object. The unfused portions of material can then be separated from the fused portions, and the unfused portions recycled for subsequent 3D formation operations.

Another way of 3D formation selectively applies binder to areas of loose build material. In this example, a "latent" part is prepared inside a build bed filled with build material. The build bed may be transferred to a furnace where a first heating operation removes solvents present in the applied binder. As solvents are removed, the remaining binder hardens and glues together build material to convert the "latent" part into a "green" part. The green part is then removed from the bed. As a result of this operation, residual build material may be caked onto the green parts. It may be desirable to remove residual build material from green parts in a cleaning operation. In some examples, the green parts are loaded into a sintering furnace where applied heat can cause binder decomposition and causes the build material powder particles to sinter or fuse together into a durable solid form.

In yet another example, a laser, or other power source is selectively aimed at a powder build material, or a layer of a powder build material, to form a slice of a 3D printed part. Such a process may be referred to as selective laser sintering. In yet another example, the additive manufacturing process may use selective laser melting where portions of the powder material, which may be metallic, are selectively melted together to form a slice of a 3D printed part. As yet another example, in fused deposition modeling melted build material is selectively deposited in a layer where it cools. As it cools it fuses together and adheres to a previous layer. This process is repeated to construct a 3D printed part.

In yet another example, the additive manufacturing process may involve using a light source to cure a liquid resin into a hard substance. Such an operation may be referred to as stereolithography. While such additive manufacturing operations have greatly expanded manufacturing and development possibilities, further development may make 3D printing a part of even more industries. Accordingly, a device which carries out any of these additive manufacturing processes may be referred to as an additive manufacturing device and in some cases a printer.

While such additive manufacturing operations have greatly expanded manufacturing and development possibilities, further development may make 3D printing a part of even more industries. For example, some objects may include electronic circuitry. In general, it is possible to place the electrical components in surface or socket mounts after the printing is done. This placement process however, may add additional processing operations, time, and cost to the manufacturing process and may be a limitation on the 3D printed object geometry.

Accordingly, the present specification describes the generation of capacitors in the 3D printed object by printing the capacitor. That is, the present specification describes systems and methods for creating 3D printed capacitors using additive manufacturing operations. These 3D printed capacitors may be generated using any number of the aforementioned additive manufacturing devices which allow for the digital control of material and multi-fluid placement in a powder bed. With this, selective control is provided over which parts of the powder will be heated and fused, as well as deliver unique properties to a scale of 10s of microns.

The 3D printed capacitors are formed using multiple agents. The agents are the conductive agent, which may be a nanoparticle ink, various fusing agents, and a dielectric agent. By utilizing the voxel control of an additive manufacturing process, electronic properties of the addressable voxels in a 3D print are controlled. Using such a process, the conductive regions and dielectric regions of the 3D printed capacitor can be generated thus creating a capacitor stack.

This approach allows for direct capacitor printing, thereby avoiding complications associated with the placement of electronic circuits into printed parts. That is, by forming 3D printed capacitors, many manufacturing operations may be simplified, and the overall design of the 3D printed object may be less constrained by lessening the number of placed components and the number of process operations. The capacitors can be created and printed without any geometry constraints in the part.

Specifically, the present specification describes an additive manufacturing system. The additive manufacturing system includes an additive manufacturing device to form a three-dimensional (3D) printed object. The additive manufacturing system also includes a controller to form a 3D printed capacitor on a body of the 3D printed object. The controller does this by controlling deposition of a conductive agent to form electrodes of the 3D printed capacitor and controlling formation of a dielectric region between the capacitive plates of the 3D printed capacitor.

The present specification also describes a method. According to the method, slices of a three-dimensional (3D) printed object are sequentially formed. A 3D printed capacitor is formed within a body of the 3D printed object by 1) depositing a conductive agent to form electrodes of the 3D printed capacitor and 2) forming a dielectric region between the electrodes of the 3D printed capacitor.

The present specification also describes a non-transitory machine-readable storage medium encoded with instructions executable by a processor. The machine-readable storage medium includes instructions. The instructions, when executed by the processor, determine a dielectric constant for a dielectric region of a three-dimensional (3D) printed capacitor to be printed. The instructions calculate capacitor forming instructions for an additive manufacturing device to form the 3D printed capacitor with a dielectric region having the dielectric constant. The instructions, when executed by the processor pass the capacitor forming instructions to an additive manufacturing controller.

Such systems and methods 1) allow for printing of electronic capacitors in a 3D printed object; 2) simplify the incorporation of electronic components into a 3D printed object by reducing the number of components placed in/on the 3D printed object; 3) reduce the constraints caused from placing lumped capacitor components in/on the 3D printed object; 4) facilitate the printing of the full range of capacitors, with these capacitors being oriented in the x-y plane of the 3D printed object, the z-direction, or any orientation within the 3D printed object; and 5) facilitate generating capacitors with different capacitance by digitally controlling amount of dielectric agent and the geometry of the different components of the capacitor. However, it is contemplated that the systems and methods disclosed herein may address other matters and deficiencies in a number of technical areas.

Figure 1:
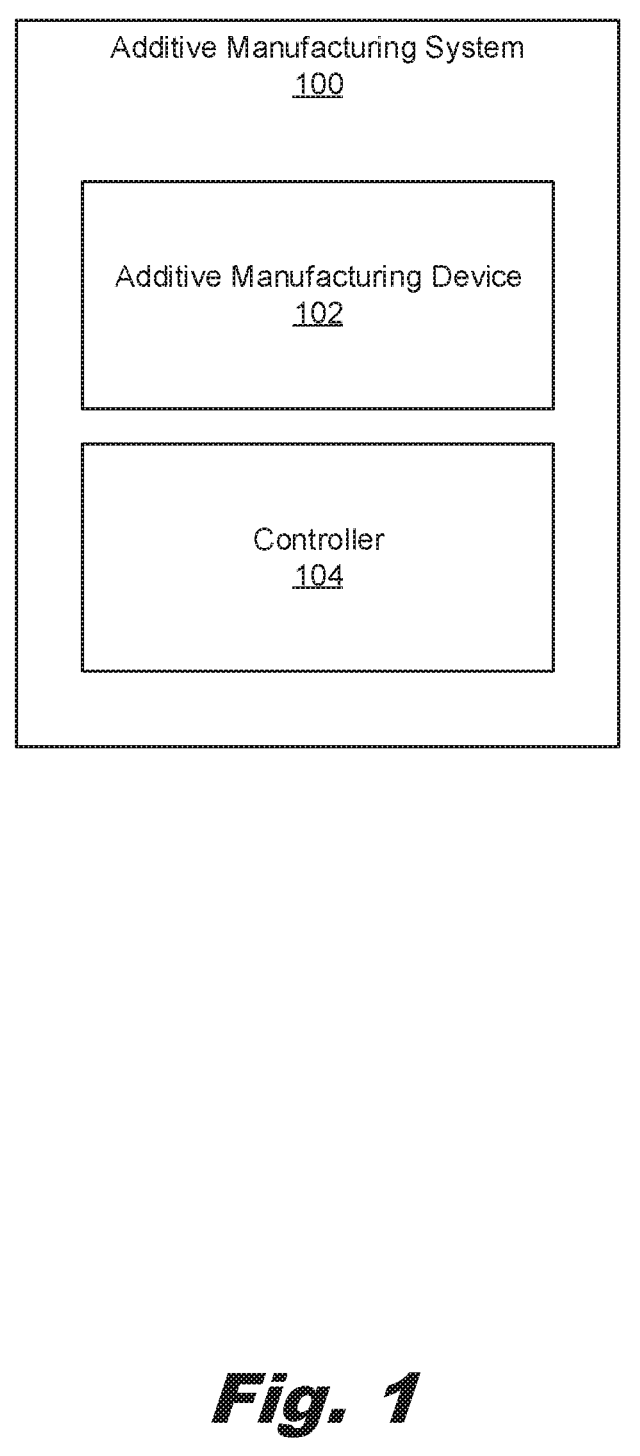

Turning now to the figures, FIG. 1 is a block diagram of an additive manufacturing system (100) for forming 3D printed capacitors, according to an example of the principles described herein. The additive manufacturing system (100) includes an additive manufacturing device (102) to form a three-dimensional (3D) printed object and the 3D printed capacitor formed therein. As described above, a 3D printed object may be formed using any variety of additive manufacturing devices (102) including a fusing-agent based system, a system where a "green" part is passed to a sintering device to sinter particles together. The additive manufacturing device (102) may also be non-agent-based systems such as a selective laser sintering device, a selective laser melting device, a fused deposition modelling device, and a stereolithographic device. In general, apparatuses for generating three-dimensional objects may be referred to as additive manufacturing devices (102). The additive manufacturing devices (102) described herein may correspond to three-dimensional printing systems, which may also be referred to as three-dimensional printers.

The additive manufacturing system (100) also includes a controller (104) to form a 3D printed capacitor on a body of the 3D printed object. The controller (104) may include various hardware components, which may include a processor and memory. The processor may include the hardware architecture to retrieve executable code from the memory and execute the executable code. As specific examples, the controller as described herein may include computer readable storage medium, computer readable storage medium and a processor, an application specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the controller (104) cause the controller (104) to implement at least the functionality of interrupting printing and resuming printing as described below.

The controller (104) controls the additive manufacturing. That is, the controller (104) instructs the additive manufacturing device (102) to form the 3D printed object. Specifically, in a fusing agent-based system, the controller (104) may direct a build material distributor to add a layer of build material. Further, the controller (104) may send instructions to direct a printhead of an agent distributor to selectively deposit the agent(s) onto the surface of a layer of the build material. The controller (104) may also direct the printhead to eject the agent(s) at specific locations to form a 3D printed object slice.

In one particular example, the controller (104) controls the agent distributor to form a 3D printed capacitor. To construct these capacitors, two components are created, and in some examples a third. The first components are the electrodes. Formation of the electrodes is done by depositing conductive agent in certain regions. Accordingly, the controller (104) controls deposition of the conductive agent to form electrodes of the 3D printed capacitor. That is, the controller (104) instructs the additive manufacturing device (102) to deposit conductive agent in regions that are intended to form the electrodes of the 3D printed capacitor.

The conductive agent may include conductive nanoparticles in a carrier fluid. Examples of conductive particles that are disposed in the carrier fluid may include silver nanoparticles, copper nanoparticles, gold nanoparticles, nickel nanoparticles, platinum nanoparticles, conductive carbon materials (carbon nanotubes, graphene, graphene oxide, etc.), conductive organic polymers, metal organic salts (copper formate, silver oxalate, etc.), metal organic decomposition inks (these inks take the form MX where M is the metal in a cationic or positive valence state and X is the anion of the salt and may be some carbon containing anion that can decompose at low temperatures and donate its electrons to reduce the metal cation to the metallic state). In these examples, the relative loading of the conductive component may be determined by the target conductivity of the capacitor.

The second component of a capacitor is the dielectric region between the electrodes. This is the region that stores the energy of the electric field and create a layer that insulates the capacitor. Accordingly, the controller (104) controls formation of the dielectric region between the electrodes of the 3D printed capacitor. This may be performed in a variety of ways including underfusing powdered build material between the electrodes and/or doping the powdered build material between the electrodes with a dopant. The controller (104) may direct additive manufacturing based on a target capacitance for the 3D printed capacitor.

There are a variety of ways in which additive manufacturing may be selected and customized. For example, a thickness of the dielectric region may be selected with different thicknesses having different capacitances. More specifically, placing the electrodes closer, thus having a thinner dielectric region, results in a capacitor with a greater capacitance.

Another example is the surface area of the electrodes, with larger electrodes providing greater capacitance. As yet another example, a surface roughness of the electrodes may be selected, with an increased surface roughness providing greater capacitance.

A target capacitance may also be achieved by controlling operation of the agent distributors of the additive manufacturing device (102). As one particular example, a degree of fusing in the dielectric region may be selected to achieve a target capacitance. Varying the degree of fusing may include controlling the amount of fusing agent that is used in the dielectric region. That is, a dielectric agent itself may not result in the fusing of an underlying build material. Accordingly, a fusing agent may be deposited thereon to facilitate the hardening of the material in the dielectric region. By varying the amount and/or loading of the fusing agent, the degree of fusing may be controlled, which degree of fusing may alter the capacitance as differently-fused build material has different electrical capacitance. The degree of fusing may be determined by the ratio of build material to air. Fully fused parts may have a dielectric constant closer to that of the build material where a lesser-fused or unfused part may have more air in it causing the dielectric to be lower. A Higher degree of fusing leads to a higher capacitance for the 3D printed capacitor.

Accordingly, controlling the degree of fusing of the polymer powdered build material allows customization of the dielectric properties through changing the material properties of the dielectric region of the 3D printed capacitor.

As another example, the fusing agent deposited may be selected to achieve a target capacitance. For example, there are different types of fusing agents, each with trigger fusing in different ways. As a specific example, a first fusing agent may cause the part to reach first temperature and a second fusing agent may cause the part to reach a different temperature. For example, while the temperature of fusion is material specific, the different fusing agents, as well as different amounts of a particular fusing agent, may cause the section of the bed where the fusing agent is deposited to absorb different amounts of energy and thus heat up more or less. The higher the temperature, the more the part will fuse. As such, the different fusing agents may result in powdered build material that is fused to differing degrees, which as described above, alters the capacitance.

As the fusing agent deposited in the dielectric region may impact the overall capacitance, so does the dielectric agent. As a starting point, the powdered build material may have a particular dielectric constant. For example, polyamide 12 has a dielectric constant of between 2.7 and 3.5. To achieve higher dielectric constant, dielectric agent may be added to the dielectric region of the 3D printed capacitor. One particular example of a dielectric agent is barium titanate ($BaTiO_3$) which has a dielectric constant between 1,000-7,000.

While specific reference is made to a particular dielectric agent, a variety of dielectric agents may be used, such as a range of different metal oxides, semiconducting, and wide-band gap fillers. Each of which may have a different dielectric constant. Accordingly, the dielectric agent that is disposed in the dielectric region may be selected to achieve a target capacitance. In addition to the specific dielectric agent used, a loading of the dielectric agent in the dielectric region may be selected to achieve a target capacitance.

In some examples, multiple dielectric agents may be deposited in the dielectric region to expand the range of target capacitances that can be achieved. For example, the dielectric region may include dielectric layers including two or more dielectric nanomaterials, which may be in discrete layers, in series, parallel, or both.

In some examples, the multiple dielectric agents may be mixed into a single formulation which would then include multiple dielectric nanomaterials. In another example, the additive manufacturing device (102) may make multiple print passes with separate dielectric agents to 1) create the dielectric mixtures or 2) to create a composite capacitor with discrete dielectric layers—each containing a different dielectric agent and consequently, different capacitances. In these examples, the overall capacitance of the 3D printed capacitor is a value determined by a series or parallel (or both) configuration. Mixed dielectrics and stacks of dielectric layers provide another method to tailor the desired effective capacitance.

The dielectric permittivity and loss tangent are based on the combination of dielectric nanoparticles, and also on the void volumes (containing air). That is, the final effective dielectric permittivity is determined by the sum of the nanoparticles and by the void fractions.

As yet another example, a detailing agent, which may cool the powdered build material and counter the fusing of the powdered build material, may be inserted into the dielectric region. That is, detailing agent may result in under-fused powder, which has a lower dielectric constant than fused powder. As with the fusing agent and dielectric agent, a variety of detailing agents may be used to affect fusing and capacitance in different ways.

In one particular example, the detailing agent is water that cools the area and prevents the powdered build powder from getting hot enough to melt. Accordingly, as with the fusing agent, varying the detailing agent results in different degrees of cooling and may alter the amount of fusing, which may result in a less dense dielectric and a lower capacitance compared to capacitors with more fused and fully fused dielectric regions. Accordingly, the specific detailing agent deposited in the dielectric region may be selected to achieve a target capacitance as may a ratio of fusing agent to detailing agent used in the dielectric region.

Accordingly, the present additive manufacturing system (100) controls a variety of characteristics of the additive manufacturing process such that any predetermined capacitance may be achieved by selecting specific values for any number of the aforementioned characteristics. This will allow a user to modulate the effective dielectric constant between the bulk properties of the powder material (PA12, dielectric constant ~3.5) and air (dielectric constant=1).

It should be noted that the additive manufacturing device (102), as controlled by the controller (104), may position the 3D printed capacitor on the surface of the 3D printed object or internally within the 3D printed object. That is, the 3D printed capacitor may be embedded inside the 3D printed object. In either case, the controller (104) also controls additive manufacturing to form electrical contacts such that the 3D printed capacitor may be coupled to other electronic circuits. Doing so may include forming electrical traces and/or contact pads by depositing and fusing a conductive agent.

FIG. 2 is a simplified top view of an additive manufacturing system (100) for forming 3D printed capacitors (210), according to an example of the principles described herein. In general, apparatuses for generating 3D objects (206) may be referred to as additive manufacturing systems (100). The additive manufacturing system (100) described herein may correspond to three-dimensional printing systems, which may also be referred to as three-dimensional printers. An additive manufacturing system (100) may use a variety of operations. For example, the additive manufacturing system (100) may be a fusing agent-based system (as depicted in FIG. 2) or a binding-agent based system. While FIG. 2 depicts a specific example of an agent-based system (100), the additive manufacturing system (100) may be any of the above-mentioned systems (100) or another type of additive manufacturing system (100).

In an example of an additive manufacturing process, a layer of build material may be formed in a build area. As used in the present specification and in the appended claims, the term "build area" refers to an area of space wherein the 3D printed object (206) is formed. The build area may refer to a space bounded by a bed (208). The build area may be defined as a three-dimensional space in which the additive manufacturing system (100) can fabricate, produce, or otherwise generate a 3D printed object (206) with its embedded 3D printed capacitor (210). That is, the build area may occupy a three-dimensional space on top of the bed (208) surface. In one example, the width and length of the build area can be the width and the length of bed (208) and the height of the build area can be the extent to which bed (208) can be moved in the z direction. Although not shown, an actuator, such as a piston, can control the vertical position of bed (208).

The bed (208) may accommodate any number of layers of build material. For example, the bed (208) may accommodate up to 4,000 layers or more. In an example, a number of build material supply receptacles may be positioned alongside the bed (208). Such build material supply receptacles source the build material that is placed on the bed (208) in a layer-wise fashion.

In the additive manufacturing process, a fusing agent may be deposited on the layer of build material that facilitates the hardening of the powder build material. In this specific example, the fusing agent may be selectively distributed on the layer of build material in a pattern of a layer of a 3D printed object (206). An energy source may temporarily apply energy to the layer of build material. The energy can be absorbed selectively into patterned areas formed by the fusing agent, while blank areas that have no fusing agent absorb less applied energy. This leads to selected zones of a layer of build material selectively fusing together. This process is then repeated, for multiple layers, until a complete physical object has been formed.

Additional layers may be formed and the operations described above may be performed for each layer to thereby generate a 3D printed object (206). The layer-by-layer formation of a 3D printed object (206) may be referred to as a layer-wise additive manufacturing process.

FIG. 2 clearly depicts the build material distributor (212). That is, in one example, the additive manufacturing system (100) includes a build material distributor (212) to successively deposit layers of the build material onto a bed. Each layer of the build material that is fused in the bed (208) forms a slice of the 3D printed object (206) such that multiple layers of fused build material form the entire 3D printed object (206). The build material distributor (212) may acquire build material from build material supply receptacles, and deposit such acquired material as a layer in the bed (208), which layer may be deposited on top of other layers of build material already processed that reside in the bed (208). In some examples, the build material distributor (212) may be coupled to a scanning carriage. In operation, the build material distributor (212) places build material in the bed (208) as the scanning carriage moves over the bed (208) along the scanning axis. While FIG. 2 depicts the build material distributor (212) as being orthogonal to the agent distributor (214), in some examples the build material distributor (212) may be in line with the agent distributor (214).

FIG. 2 also depicts the agent distributor (214) to form the 3D printed object (206) and the 3D printed capacitor (210). The agent distributor (214) does so by depositing at least one agent onto a layer of powdered build material. The agent distributor (214) may distribute a variety of agents. One specific example of an agent is a fusing agent, which increases the energy absorption of portions of the build material that receive the fusing agent to selectively solidify portions of a layer of powdered build material. The agent distributor (214) may deposit other agents to form the 3D printed object (206). For example, the agent distributor (214) may deposit a binder agent that temporarily glues portions of the 3D printed object (206) together.

The agent distributor (214) may deposit the agents used to form the 3D printed capacitor (210) as well. For example, the agent distributor (214) may deposit a detailing agent, a dielectric agent, and a conductive agent. While FIG. 2 depicts a single box to represent the agent distributor (214), the agent distributor (214) may include distinct sub-assemblies, each to distribute a different of the aforementioned agents.

In some examples, an agent distributor (214) includes at least one liquid ejection device to distribute a functional agent onto the layers of build material. A liquid ejection device may include at least one printhead (e.g., a thermal ejection based printhead, a piezoelectric ejection based printhead, etc.). In some examples, the agent distributor (214) is coupled to a scanning carriage, and the scanning carriage moves along a scanning axis over the bed (208). In one example, printheads that are used in inkjet printing devices may be used in the agent distributor (214). In this example, the fusing agent may be a printing liquid. In other examples, an agent distributor (214) may include other types of liquid ejection devices that selectively eject small volumes of liquid.

FIG. 2 also depicts the controller (104) which controls the build material distributor (212) and the agent distributor (214) to form the 3D printed object (206) and the 3D printed capacitor (210).

Figure 3A:
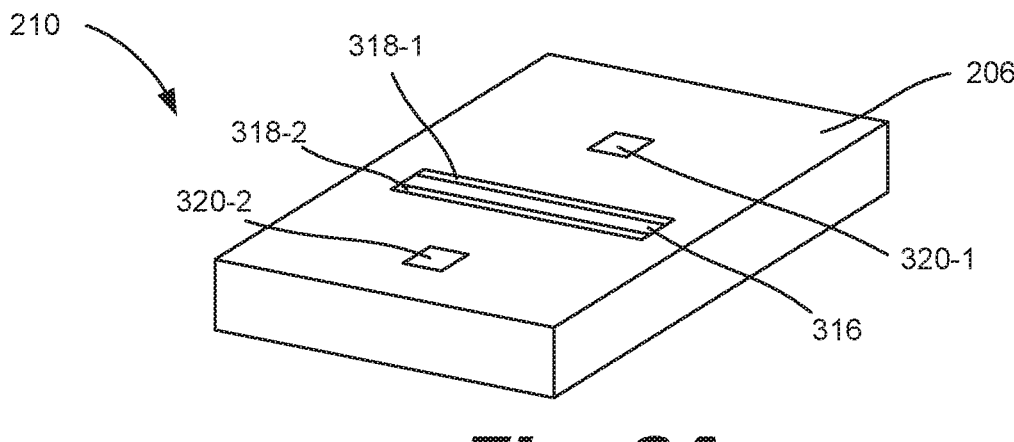
FIGS. 3A-3C are views of an example of a 3D printed capacitor, according to an example of the principles described herein.
Figure 3B:
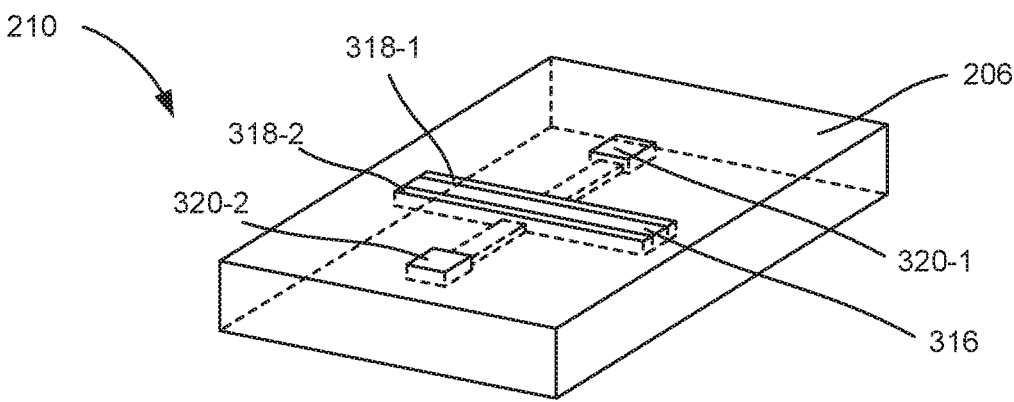
Figure 3C:
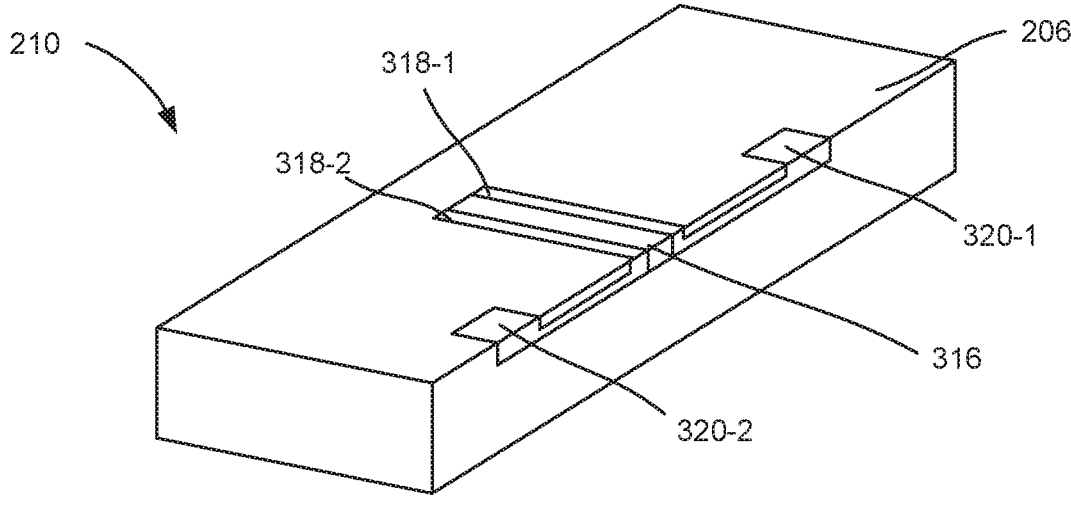

FIGS. 3A-3C are views of an example of a 3D printed capacitor (210), according to an example of the principles described herein. Specifically, FIG. 3A is an isometric view of a portion of a 3D printed object (206) that includes the 3D printed capacitor (210), FIG. 3B is a transparent view of the 3D printed capacitor (210) in the 3D printed object (206), and FIG. 3C is a cut-away view of the 3D printed capacitor (210) in the 3D printed object (206).

Figure 4A:
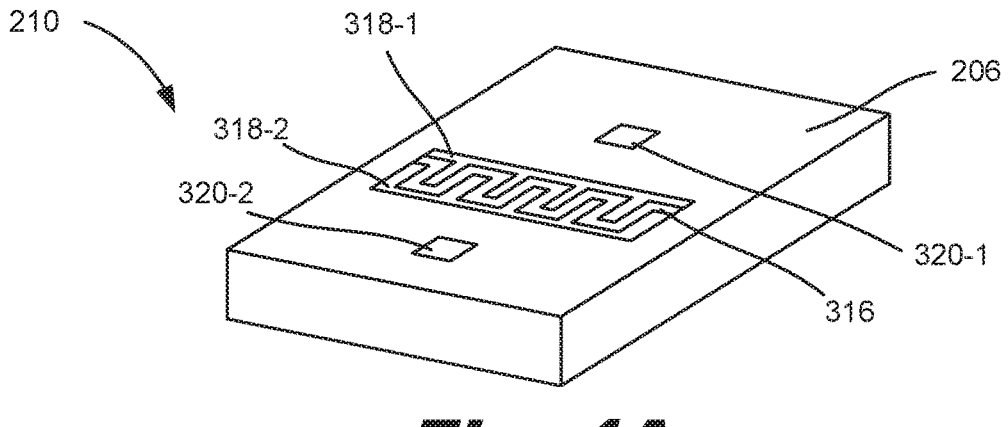
FIGS. 4A-4C are views of an example of a 3D printed capacitor, according to another example of the principles described herein.
Figure 4B:
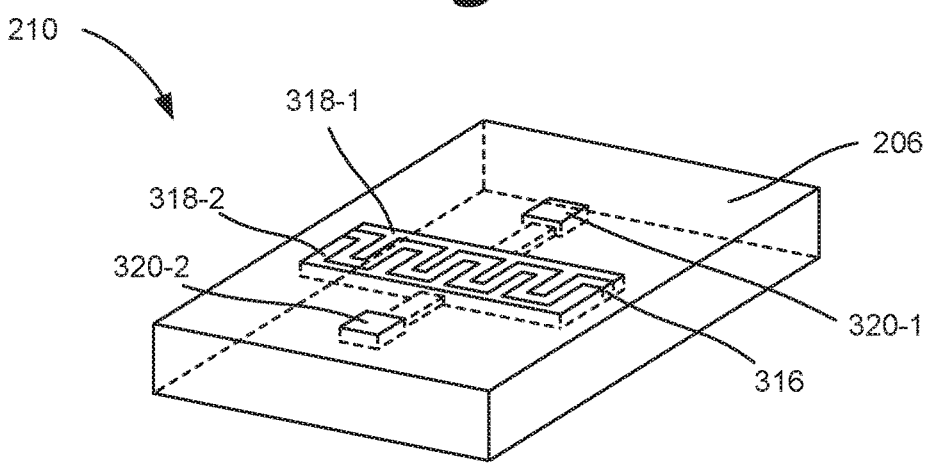
Figure 4C:
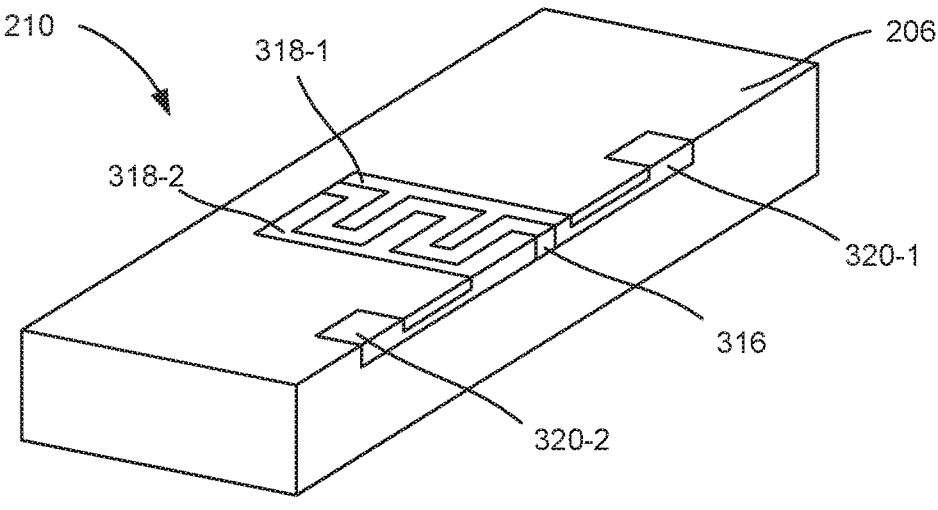
Figures 5A, 5B, 5C:
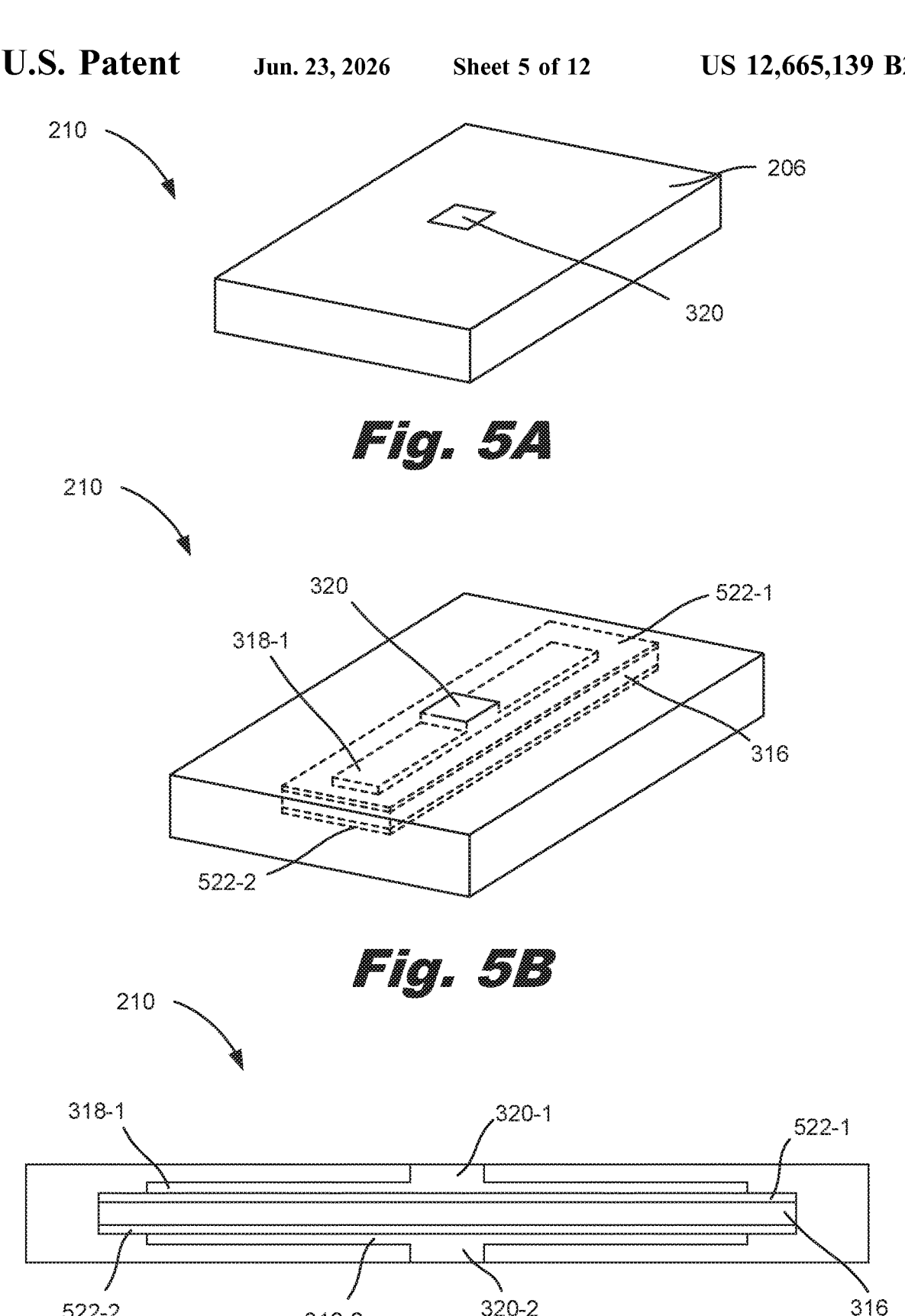
FIGS. 5A-5C are views of an example of a 3D printed capacitor, according to another example of the principles described herein.

As described above, to create a 3D printed capacitor (210), two electrodes (318-1, 318-2) are separated by a dielectric region (316). These components and regions may have a variety of shapes, sizes, and orientations. Accordingly, FIGS. 3A-5C depict different 3D printed capacitor (210) forms. Specifically, FIGS. 3A-3C depict a parallel plate 3D printed capacitor (210). That is, the additive manufacturing device (FIG. 1, 102) forms parallel electrodes (318-1, 318-2) for the 3D printed capacitor (210). FIGS. 4A-4C depict an interdigitated 3D printed capacitor (210) and FIGS. 5A-5C depict a vertical 3D printed capacitor (210), where electrodes (318-1, 318-2) are vertical of one another. With the parallel and interdigitated capacitors (210) as depicted in FIGS. 3A-4C, the electrodes (318-1, 318-2) and the dielectric region (316) are defined by the agents being jetted down by the agent distributor (FIG. 2, 214) and subsequently built up in the z dimension by forming sequential layers until the final capacitor height has been obtained. In the vertical 3D printed capacitor (210) as depicted in FIGS. 5A-5C, print layers are used to isolate the electrodes (318-1, 318-2) and the dielectric region (316). While specific reference is made to three particular examples, a 3D printed capacitor (210) may be formed to have any variety of sizes, shapes, and orientations and properties of all three examples may be combined to form capacitors that fully utilize the addressable 3D volume of a part.

FIGS. 3A-3C also depict the contacts (320-1, 320-2) that are used to couple the electrodes (318-1, 318-2) to different electrical circuit components. As depicted in FIGS. 3B and 3C, these contacts (320-1, 320-2) are coupled to the electrodes (318-1, 318-2) via electrical traces. While some of the components of the 3D printed capacitor (210) are disposed on the surface, others, such as the electrical traces may be sub-surface components.

As described above, different characteristics of these components may affect the capacitance of the 3D printed capacitor (210). For example, given the direct proportionality of capacitance to the areas of the electrodes (318-1, 318-2), which in the case of the parallel electrodes (318) is represented by the relationship $C = _{\varepsilon_r \varepsilon_0} A/d$, where A is the surface area of the electrode (318) area, d is the distance between the two electrodes (318) and may include the dielectric region (316) and any barrier regions, and $\varepsilon_r \varepsilon_0$ is the product of the relative dielectric permittivity of the material and the permittivity of free space, a wide variety of capacitances can be achieved by adjusting area of the electrodes (318) and/or the thickness of the dielectric region (316).

Moreover, a target capacitance may be reached by, for example controlling operation of the additive manufacturing device (FIG. 1, 102) by, for example, selecting particular detailing agents, dielectric agents, and fusing agents to use. Quantities and ratios of these different agents may also be selected to achieve a target capacitance. Accordingly, the present additive manufacturing system (FIG. 1, 100) allows for the generation of capacitors by printing them, rather than placing them, and can facilitate the generation of capacitors having any value capacitance.

FIGS. 4A-4C are views of an example of a 3D printed capacitor (210), according to another example of the principles described herein. Specifically, FIG. 4A is an isometric view of a portion of a 3D printed object (206) that includes the 3D printed capacitor (210), FIG. 4B is a transparent view of the 3D printed capacitor (210) in the 3D printed object (206), and FIG. 4C is a cut-away view of the 3D printed capacitor (210) in the 3D printed object (206).

As described above, to create a 3D printed capacitor (210), two electrodes (318-1, 318-2) are separated by a dielectric region (316). These components and regions may have a variety of shapes, sizes, and orientations. FIGS. 4A-4C depict an interdigitated 3D printed capacitor (210), or a capacitor (210) where the dielectric region (316) weaves or snakes. That is, the additive manufacturing device (FIG. 1, 102) forms interdigitated electrodes (318-1, 318-2) for the 3D printed capacitor (210). As described above, capacitance of a capacitor is defined in part based on the surface area of the electrodes (318). Interdigitated electrodes (318) as depicted in FIGS. 4A-4C, increase the surface area of the electrodes (318) without increasing the space they occupy on the surface of, or within, the 3D printed object (206).

FIGS. 4A-4C also depict the contacts (320-1, 320-2) that are used to couple the electrodes (318-1, 318-2) to different electrical circuit components. As in the example depicted in FIG. 3A-3C, the contacts (320-1, 320-2) may be connected to the electrodes (318-1, 318-2) via sub-surface traces as depicted in FIGS. 4B and 4C.

FIGS. 5A-5C are views of an example of a 3D printed capacitor (210), according to another example of the principles described herein. Specifically, FIG. 5A is an isometric view of a portion of a 3D printed object (206) that includes the 3D printed capacitor (210), FIG. 5B is a transparent view of the 3D printed capacitor (210) in the 3D printed object (206), and FIG. 5C is a cross-sectional view of the 3D printed capacitor (210) in the 3D printed object (206). In the example depicted in FIGS. 5A— 5C, the electrodes (318-1, 318-2) are vertically-oriented within a build area of an additive manufacturing device (FIG. 1, 100). That is, print layers are used to isolate the electrodes (318-1, 318-2) and the dielectric region (316).

As FIGS. 5A-5C depict a vertically-oriented 3D printed capacitor (210), the contacts (320-1, 320-2) may be on opposite surfaces of the 3D printed object (206) as depicted in FIG. 5C.

FIGS. 5B and 5C depict another component of a 3D printed capacitor (206). That is, in some examples, the 3D printed capacitor (206) includes barrier regions (522-1, 522-2) on either side of the dielectric region (316). The barrier regions (522-1, 522-2) isolate the electrodes (318-1, 318-2) and the dielectric region (316). The barrier regions (522-1, 522-2) prevent the electrodes (318-1, 318-2) from shorting across the dielectric region (316) and control the interfacial roughness between the electrodes (318-1, 318-2) and the dielectric region (316).

The barrier regions (522-1, 522-2) also ensure the performance of the 3D printed capacitor (206), specifically in cases when there are high loadings of both conductive and dielectric agents. This is because the high loadings of the conductive agents and dielectric agents produce local cooling which hinders the fusion of the powdered build material in the dielectric region (316) and powdered build material surrounding the 3D printed capacitor (206).

That is, the conductive agent may include metallic nanoparticles, such as silver nanoparticles. The region where the conductive agent is deposited may not achieve a powdered build material fusing temperature, which may be around 180 degrees Celsius (C). However, the silver nanoparticles themselves sinter at around 160 C and thus still result in a cohesive and solid structure even if the powdered build material in that region does not fully fuse.

The dielectric agent, such as BaTiO$_3$, may also result in localized cooling, but may not have the same property of sintering. Accordingly, the powdered build material in this region may flow, rather than being a cohesive solid structure. This property allows the dielectric agent to more easily infiltrate through the more porous sections of the 3D printed capacitor (210) and lead to shorting or reduce the dimensional accuracy of the printed component. Specifically, in a vertically-oriented 3D printed capacitor (210), the dielectric agent may seep into the second electrode (318-2) region, thus decreasing its conductivity.

Moreover, due to thermal bleed, the low temperatures resulting from deposition of the dielectric agent may affect the temperatures of adjacent voxels, whether the adjacent voxels be portions that form a subsequently deposited electrode (318-1) or an adjacent non-capacitor portion of the 3D printed object (206). For example, due to thermal bleed, powdered build material that is deposited on top of the dielectric agent and intended to form the first electrode (318-1) may not rise to the appropriate temperature in the presence of heat energy and thus may not properly solidify resulting in a different conductance than intended. Such under-fusing may affect the predictability of performance of the 3D printed capacitor (210) and may impact the 3D printed capacitor (210) ability to perform. Similarly, such local cooling may reduce the ability of adjacent non-capacitor powdered build material to fuse, which reduces the dimensional accuracy of the 3D printed object (206).

Accordingly, the barrier regions (522-1, 522-2) form a buffer region between the electrodes (318-1, 318-2) and the dielectric region (316). Specifically, the barrier regions (522-1, 522-2) isolate the dielectric region (316) and the electrodes (318-1, 318-2) so that dielectric agent does not seep into the electrode (318) to decrease the effective dielectric constant in that section. The barrier regions (522-1, 522-2) also prevent thermal bleed to non-capacitor regions of the 3D printed object (206) to enhance dimensional accuracy.

As described above, capacitance is based at least in part on a thickness of the dielectric region (316). That is, the closer the electrodes (318-1, 318-2) are to one another, the greater the capacitance. The barrier regions (522-1, 522-2) allow for a decreased dielectric region (316) thickness while avoiding thermal bleed and sub-fusing temperatures in that region, thus enhancing the range of capacitances that can be effectively achieved.

In some examples, the barrier regions (522-1, 522-2) are formed of fused build material. In this example, the barrier regions (522-1, 522-2) may have a dielectric constant similar to the non-capacitor regions of the 3D printed object (206). Accordingly, the thickness of the barrier regions (522-1, 522-2) may factor into the overall effective dielectric between the two electrodes (318-1, 318-2). Accordingly, the controller (FIG. 1, 104) may select a thickness of the barrier regions (522) between each electrode (318) and the dielectric region (316) to achieve a target capacitance. That is, as with the other portions of the 3D printed capacitor (210), the thickness of the barrier regions (522) may be controlled to tailor the overall effective dielectric constant.

While FIGS. 5A-5C depict barrier regions (522) in the vertically-oriented 3D printed capacitor (210), the barrier regions (522) may also be used in other 3D printed capacitors (210) such as the parallel and interdigitated 3D printed capacitors (210). However, such barrier regions (522) may be implemented in the vertically-oriented 3D printed capacitor (210) due to the ease of shorting across layers with a high loading of the conductive agent through a more porous dielectric region (316).

Tables (1), (2), and (3) below presents the results of the electrical characterization for the parallel (P), interdigitated (I), and vertical (V) 3D printed capacitors (210), respectively based on volume percentage loading of a dielectric agent, which in this example is barium titanate (BaTiO$_3$).

TABLE 1

| Average for Parallel Capacitors | |
| --- | --- |
| Vol % of Dielectric Agent | Capacitance (pF) |
| 5.986 | 12.2 |
| 3.657 | 7.6 |
| 2.058 | 3.7 |
| 1.097 | 2.9 |
| 0 | 2.3 |

TABLE 2

| Average for Interdigitated Capacitors | |
| --- | --- |
| Vol % of Dielectric Agent | Capacitance (pF) |
| 5.986 | 12.8 |
| 4.948 | 8.4 |
| 3.657 | 11.8 |
| 2.058 | 2.1 |
| 1.097 | 3.85 |
| 0 | 3.8 |

TABLE 3

| Average for Vertical Capacitors | |
| --- | --- |
| Vol % of Dielectric Agent | Capacitance (pF) |
| 5.986 | 33.83 |
| 4.948 | 29.67 |
| 3.657 | 13.38 |
| 2.857 | 7.73 |
| 2.058 | 5.95 |
| 1.097 | 4.40 |

As indicated, both the parallel and interdigitated 3D printed capacitors (210) show an increase of the capacitance when volume percentage of the dielectric agent was increased. Some noise in the measured capacitance in the 3D printed capacitors (210) from sample to sample caused the interdigitated sample to exhibit some variability in the trend. The vertical 3D printed capacitors (210) show similar trends over multiple samples. That is, as the volume percent of dielectric agent is increased, the capacitance increases as well. Additionally, with the horizontal geometry the capacitor area is larger leading to a higher measured capacitance of the 3D printed capacitors (210).

Figure 6:
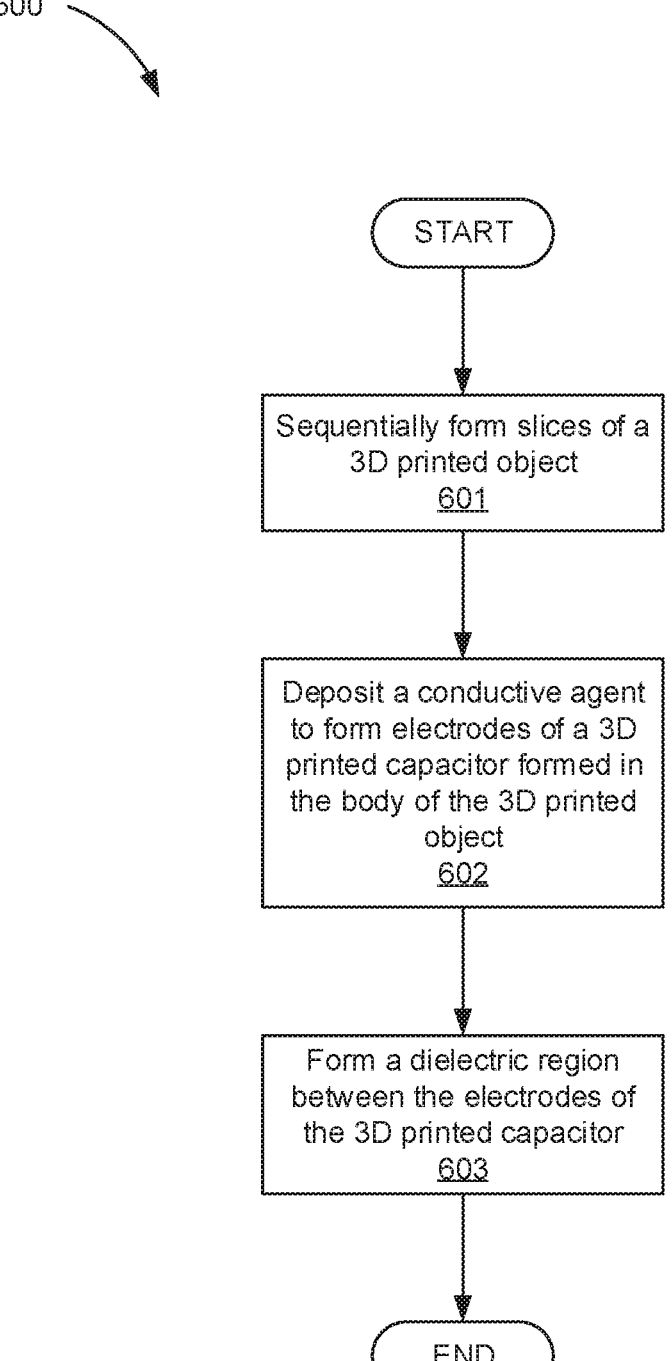
FIG. 6 is a flow chart of a method for forming 3D printed capacitors, according to an example of the principles described herein.

FIG. 6 is a flow chart of a method (600) for forming 3D printed capacitors (FIG. 2, 210), according to an example of the principles described herein. As described above, additive manufacturing involves the layer-wise deposition of build material and hardening/curing/sintering/fusing of certain portions of that layer to form a slice of a 3D printed object (FIG. 2, 206). Accordingly, in this example, the method (600) includes sequentially forming (block 601) slices of a 3D printed object (FIG. 2, 206). In some examples, this includes sequentially depositing layers of build material and a fusing agent to form slices of a 3D printed object (FIG. 2, 26). This includes sequential activation, per slice, of a build material distributor (FIG. 2, 212) and an agent distributor (FIG. 2, 214) and the scanning carriages to which they may be coupled so that each distribute its respective composition across the surface.

According to the method, a 3D printed capacitor (FIG. 2, 210) is also formed, in some examples within a body of the 3D printed object (FIG. 2, 206). In a similar fashion, the 3D printed capacitor (FIG. 2, 210) is formed in a layer-wise fashion. Forming slices of the 3D printed object (FIG. 2, 206) that include a slice of a 3D printed capacitor (FIG. 2, 210) includes depositing powdered build material and depositing (block 602) a conductive agent on portions of the slice of the 3D printed object (FIG. 2, 206) that correspond to the electrodes (FIG. 3, 318), thus forming the electrodes (FIG. 3, 318) of the 3D printed capacitor (FIG. 2, 210).

The method (600) also includes forming (block 603) the dielectric region (FIG. 3, 316) between the electrodes (FIG.

3, 318) of the 3D printed capacitor (FIG. 2, 210). The dielectric region (FIG. 3, 316) may be formed in a variety of ways. For example, as described above, powdered build material between the electrodes (FIG. 3, 318-1, 318-2) may be doped with dielectric agent. That is, a dielectric agent may be deposited on portions of the slice of the 3D printed object (FIG. 2, 206) that correspond to the dielectric region (FIG. 3, 316).

As described doping the powdered build material with dielectric agents may include doping the powdered build material with multiple dielectric agents, which may be deposited as a mixture or deposited separately to form a mixture. In another example, doping the powdered build material with multiple dielectric agents may include the sequential formation of distinct dielectric layers, each with a distinct dielectric constant.

In some examples, in addition to depositing a dielectric agent in the dielectric region (FIG. 3, 316), a fusing agent may be deposited in the dielectric region (FIG. 3, 316). In some examples, the fusing agent that is deposited in the dielectric region (FIG. 3, 316) may be mixed with the dielectric agent. In other examples, the two agents may be separately deposited in the dielectric region (FIG. 3, 316).

Depositing a fusing agent in the dielectric region may enhance the formation of the 3D printed capacitor (FIG. 2, 210) and the overall 3D printed object (FIG. 2, 210). That is, as described above, the conductive and dielectric agents may decrease the temperature of the respective portions of the 3D printed object (FIG. 2, 206). The metallic nanoparticles in the conductive agent will sinter. However, in the dielectric region (FIG. 3, 316), the temperature decrease is accounted for by making depositing fusing agent to compensate for the temperature drop in that region. Fusing agent is also deposited in the surrounding section to prevent effects of thermal bleed from the cooler dielectric region (FIG. 3, 316). In other words, fusing agent is deposited in non-electrode portions of the slice of the 3D printed object (FIG. 2, 206) which non-electrode portions include the dielectric region (FIG. 3, 316) and surrounding non-capacitor regions of the 3D printed object (FIG. 2, 206). To achieve some target capacitances, the agent distributor (FIG. 2, 214) may pass over the dielectric region (FIG. 3, 316) multiple times, each time depositing a layer of dielectric agent.

In another example, forming (block 603) the dielectric region (FIG. 3, 316) may include underfusing powdered build material between the electrodes (FIG. 3, 318). That is, the degree of fusing of powdered build material affects its capacitance. For example, for a particular plate size and distance, unfused building material may have a capacitance of between 1 and 2 picoFarads (pF) and fused building material may have a capacitance of between 2 and 4 (pF). Accordingly, capacitance can be customized in some examples by changing the degree to which powdered build material is fused. This may include adjusting the amount of fusing agent deposited in the dielectric region (FIG. 3, 316).

In another example, forming (block 603) the dielectric region (FIG. 316) may include forming an air pocket between the electrodes (FIG. 3, 318). In this example, detailing agent may be deposited, which does not fuse when exposed to heat energy. The detailing agent may then be removed to form the air pocket.

Figure 7:
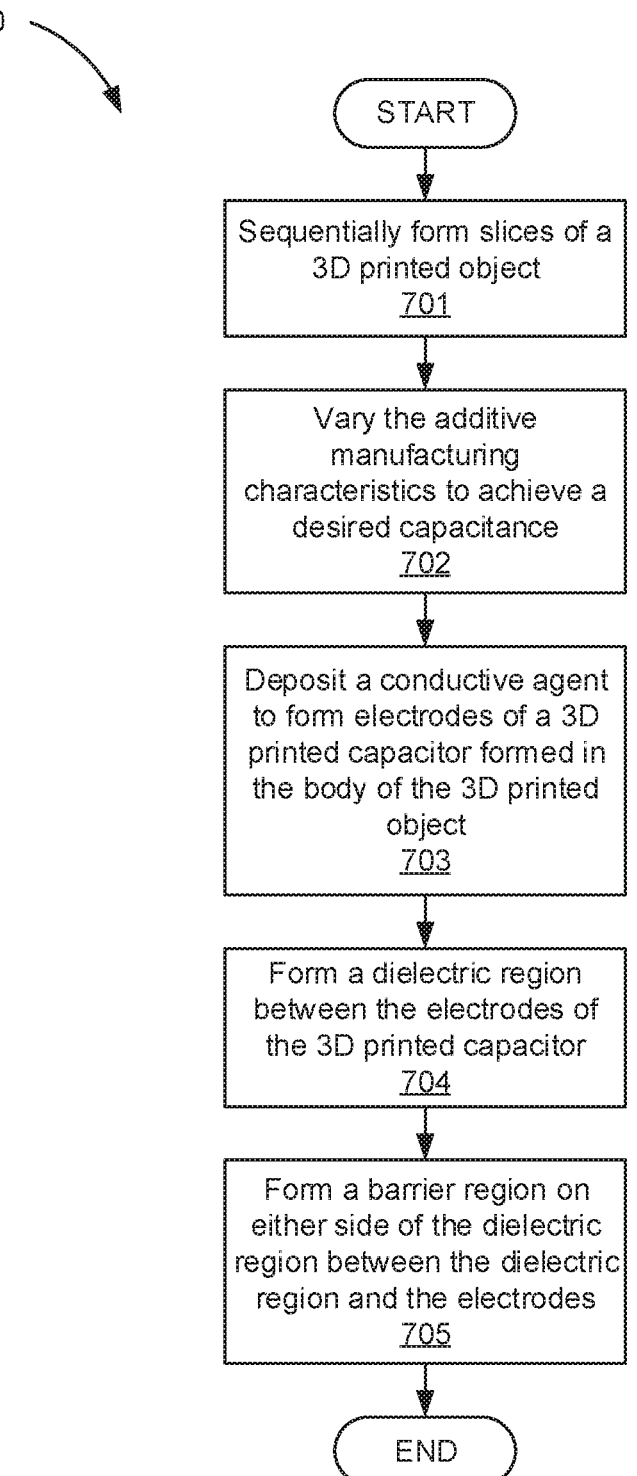
FIG. 7 is a flow chart of a method for forming 3D printed capacitors, according to another example of the principles described herein.
Figure 8A:
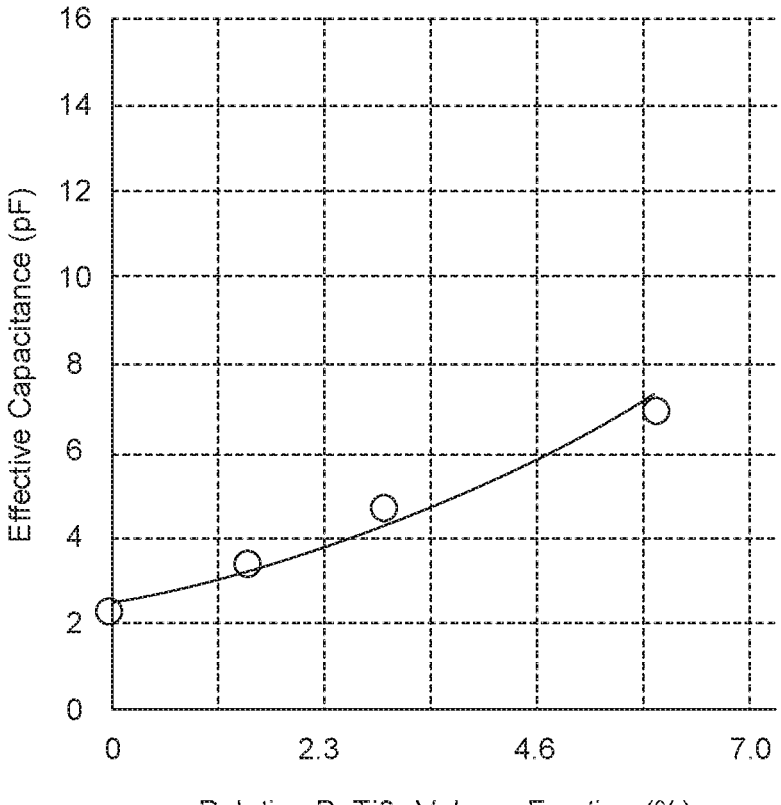
FIGS. 8A-8D are graphs depicting various effective capacitances of different 3D printed capacitors, according to an example of the principles described herein.
Figure 8B:
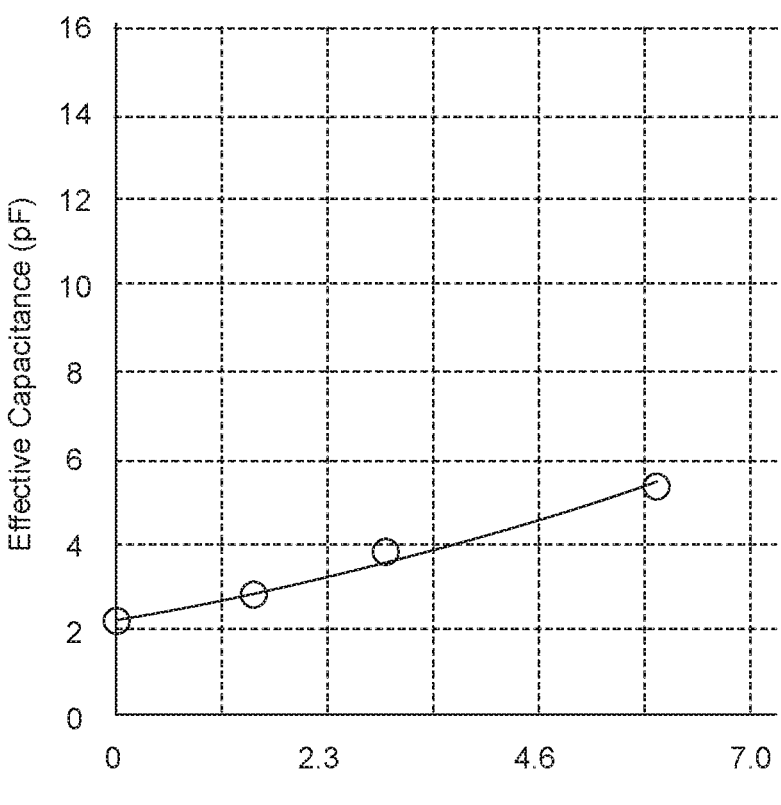
Figure 8C:
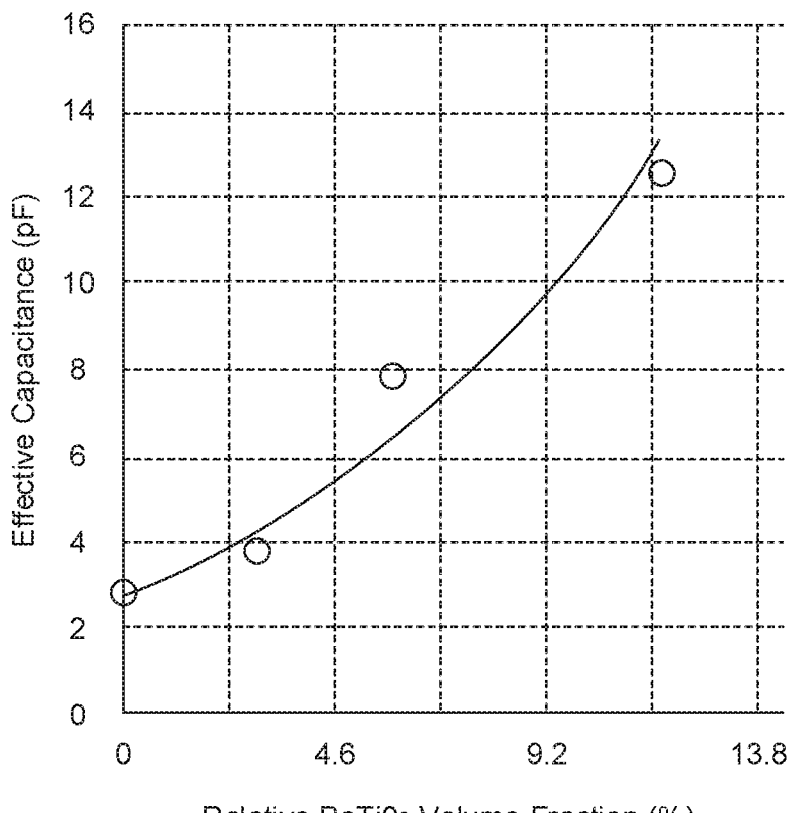
Figure 8D:
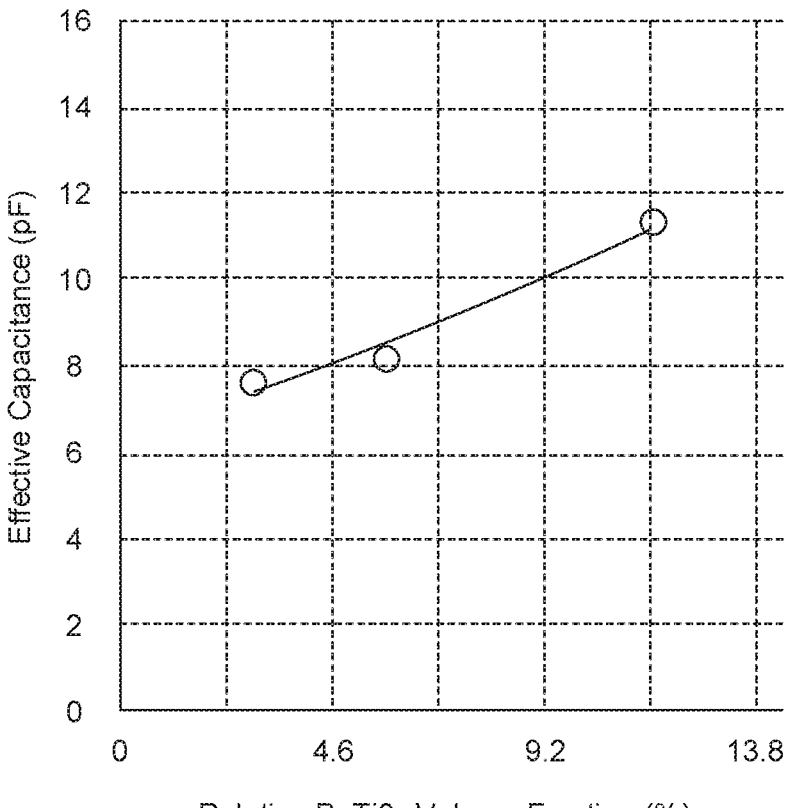

FIG. 7 is a flow chart of a method (700) for forming 3D printed capacitors (FIG. 2, 210), according to another example of the principles described herein. According to the method (700), slices of a 3D printed object (FIG. 2, 206) are sequentially formed (block 701). This may be performed as described above in connection with FIG. 6.

As described above, additive manufacturing may be varied (block 702) to achieve a target capacitance. That is, capacitor forming instructions may include data that indicates particular plate sizes/spacings and/or fluid loadings to be used by the additive manufacturing device (FIG. 1, 102) to form the 3D printed capacitor (FIG. 2, 210). These capacitor forming instructions may indicate such things as a thickness of the dielectric region (FIG. 3, 316); a surface area of the electrodes (FIG. 3, 318); a surface roughness of the electrodes (FIG. 3, 318); a thickness of a barrier region (FIG. 5, 522) between each electrode (FIG. 3, 318) and the dielectric region (FIG. 3, 316); a degree of fusing in the dielectric region (FIG. 3, 316); a fusing agent deposited in the dielectric region (FIG. 3, 316); a loading of the fusing agent deposited in the dielectric region (FIG. 3, 316); a dielectric agent deposited in the dielectric region (FIG. 3, 316); a loading of the dielectric agent in the dielectric region (FIG. 3, 316); a detailing agent deposited in the dielectric region (FIG. 3, 316); and a ratio of fusing agent to detailing agent used in the dielectric region (FIG. 3, 316) may be selected to achieve the target capacitance.

A conductive agent is deposited (block 703) to form electrodes (FIG. 3, 318) of the 3D printed capacitor (FIG. 2, 210) and a dielectric region (FIG. 3, 316) is formed (block 704) between the electrodes (FIG. 3, 318). These operations may be performed as described above in connection with FIG. 7.

In some examples, a barrier region (FIG. 5, 522) is formed on either side of the dielectric region (FIG. 3, 316) between the dielectric region (FIG. 3, 316) and a corresponding electrode (FIG. 3, 318). That is, for the reasons mentioned above, a barrier region (FIG. 5, 522) enhances the performance and reliability of performance of the 3D printed capacitor (FIG. 2, 210). That is, a sufficient fusing temperature (for example, greater than 180 C) is achieved in the non-capacitor portions of the 3D printed object (FIG. 2, 206) while temperature drops in the regions where the conductive and dielectric agents are deposited, may result in a temperature that does not result in fusion. This temperature drop may impede the performance of the 3D printed capacitor (FIG. 2, 210) and the dimensional accuracy of the 3D printed object (FIG. 2, 206). Accordingly, when a barrier region (FIG. 5, 522) is formed (block 705), the temperature drop is reduced thus increasing the reliability and predictability of the performance of the 3D printed capacitor (FIG. 2, 210) and dimensional accuracy of the 3D printed object (FIG. 2, 206).

FIGS. 8A-8D are graphs depicting various effective capacitances of different 3D printed capacitors (FIG. 2, 210), according to an example of the principles described herein. Data values, as indicated by circles, were fit with an exponential function and all demonstrated high $R^2$ value (close to 1). As demonstrated by these graphs, capacitance, measured in picoFarads (pF) may be effectively predicted such that target capacitances may be achieved with relative success and predictability.

Figure 9:
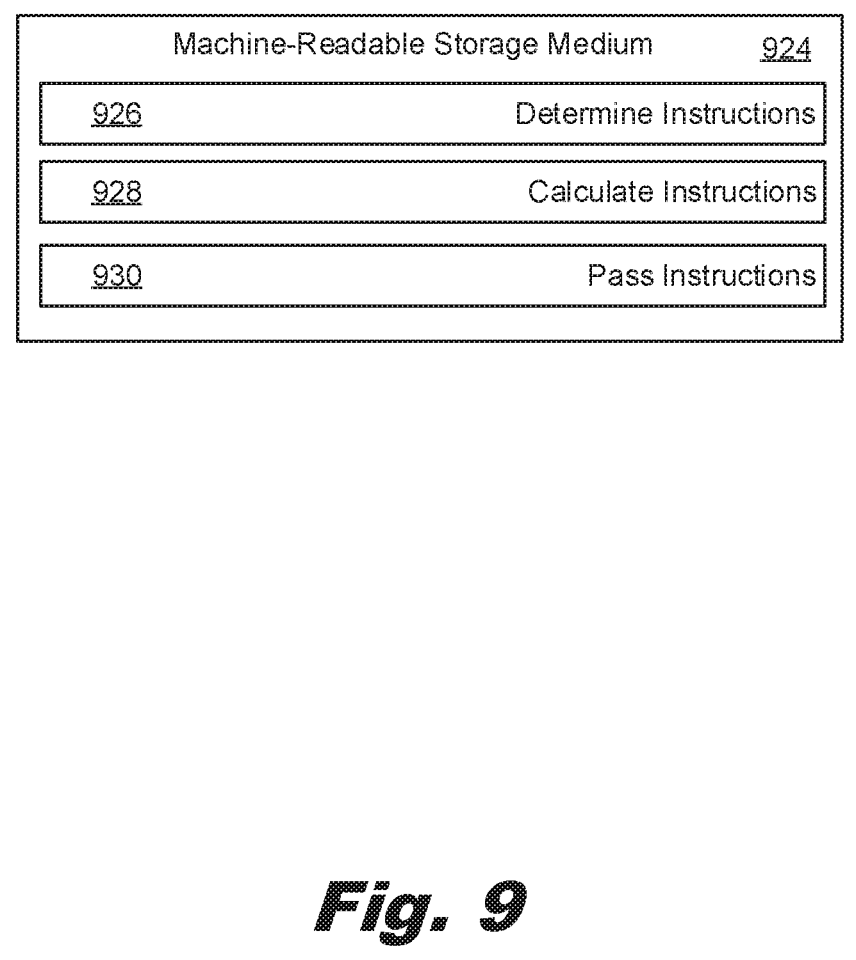

FIG. 9 depicts a non-transitory machine-readable storage medium (924) for forming 3D printed capacitors (FIG. 2, 210), according to an example of the principles described herein. To achieve its desired functionality, a computing system includes various hardware components. Specifically, a computing system includes a processor and a machine-readable storage medium (924). The machine-readable storage medium (924) is communicatively coupled to the processor. The machine-readable storage medium (924) includes a number of instructions (926, 928, 930) for performing a designated function. The machine-readable storage medium (924) causes the processor to execute the designated function of the instructions (926, 928, 930). The machine-readable storage medium (924) can store data, programs, instructions, or any other machine-readable data that can be utilized to operate the additive manufacturing system (FIG. 1, 100). Machine-readable storage medium (924) can store computer readable instructions that the processor of the controller (FIG. 1, 104) can process, or execute. The machine-readable storage medium (924) can be an electronic, magnetic, optical, or other physical storage device that contains or stores executable instructions. Machine-readable storage medium (924) may be, for example, Random Access Memory (RAM), an Electrically Erasable Programmable Read-Only Memory (EEPROM), a storage device, an optical disc, etc. The machine-readable storage medium (924) may be a non-transitory machine-readable storage medium (924).

Referring to FIG. 9, determine instructions (926), when executed by the processor, cause the processor to determine a dielectric constant for a dielectric region (FIG. 3, 316) of a 3D printed capacitor (FIG. 2, 210) to be printed. Calculate instructions (926), when executed by the processor, may cause the processor to calculate capacitor forming instructions for an additive manufacturing device (FIG. 1, 102) to form the 3D printed capacitor (FIG. 2, 210) with a dielectric region (FIG. 3, 316) having the dielectric constant. Such capacitor forming instructions may include a quantity of at least one of a fusing agent, detailing, and dielectric agent to apply in the dielectric region (FIG. 3, 316). Pass instructions (930), when executed by the processor, may cause the processor to pass the capacitor forming instructions to an additive manufacturing controller.

Such systems and methods 1) allow for printing of electronic capacitors in a 3D printed object; 2) simplify the incorporation of electronic components into a 3D printed object by lessening the number of components placed in/on the 3D printed object; 3) reduce the design constraints caused from placing lumped capacitor components in/on the 3D printed object; 4) facilitate the printing of the full range of capacitors, with these capacitors being oriented in the x-y plane of the 3D printed object, the z-direction, or any orientation within the 3D printed object; and 5) facilitate generating capacitors with different capacitance by digitally controlling amount of dielectric agent and the geometry of the different components of the capacitor. However, it is contemplated that the systems and methods disclosed herein may address other matters and deficiencies in a number of technical areas.

What is claimed is:

1. A method for additively manufacturing a three-dimensional (3D) printed object comprising:

sequentially depositing and selectively fusing layers of build material to form slices of the 3D printed object; and forming a 3D printed capacitor within a body of the 3D printed object by:

depositing and selectively fusing one or more layers of a conductive agent to form a first electrode and a second electrode of the 3D printed capacitor; and depositing and selectively fusing one or more layers of a dielectric agent to form a dielectric region between the first electrode and the second electrode of the 3D printed capacitor, wherein sequentially depositing and selectively fusing the layers of the build material to form the slices of the 3D printed object also forms a first continuous barrier region between the first electrode and the dielectric region and a second continuous barrier region between the second electrode and the dielectric region, and wherein a degree of fusing is varied in additively manufacturing the 3D printed object.

2. The method of claim 1, wherein varying the degree of fusing in additively manufacturing the 3D printed object achieves a target capacitance for the 3D printed capacitor.

3. The method of claim 1, wherein depositing and selectively fusing the one or more layers of the dielectric agent to form the dielectric region further comprises at least one of:

underfusing a powdered build material between the first electrode and the second electrode;

forming an air pocket between the first electrode and the second electrode; and doping the powdered build material between the first electrode and the second electrode with the dielectric agent.

4. The method of claim 3, wherein doping of the powdered build material between the first electrode and the second electrode comprises doping the powdered build material with multiple dielectric agents including the dielectric agent.

5. The method of claim 1, wherein the first electrode and the second electrode are vertically oriented within a build area of an additive manufacturing device.

6. The method of claim 1, wherein portions of at least one of the slices of the 3D printed object respectively correspond to the first electrode, the second electrode, and the dielectric region, wherein depositing and selectively fusing the one or more layers of the conductive agent comprises depositing the conductive agent on the portions of the at least one of the slices of the 3D printed object that correspond to the first electrode and the second electrode, and wherein depositing and selectively fusing the one or more layers of the dielectric agent comprises depositing the dielectric agent on the portions of the at least one of the slices of the 3D printed object that correspond to the dielectric region.

7. The method of claim 1, wherein the dielectric agent deposited in the dielectric region is mixed with a fusing agent prior to selectively fusing the dielectric agent.

8. A non-transitory computer-readable data storage medium storing instructions executable by a processor to perform a processing for additively manufacturing a three-dimensional (3D) printed object comprising:

sequentially depositing and selectively fusing layers of build material to form slices of the 3D printed object; and forming a 3D printed capacitor within a body of the 3D printed object by:

depositing and selectively fusing one or more layers of a conductive agent to form a first electrode and a second electrode of the 3D printed capacitor; and depositing and selectively fusing one or more layers of a dielectric agent to form a dielectric region between the first electrode and the second electrode of the 3D printed capacitor, wherein sequentially depositing and selectively fusing the layers of the build material to form the slices of the 3D printed object also forms a first continuous barrier region between the first electrode and the dielectric region and a second continuous barrier region between the second electrode and the dielectric region, and wherein a degree of fusing is varied in additive manufacturing of the 3D printed object.

9. The non-transitory computer-readable data storage medium of claim 8, wherein varying the degree of fusing in additively manufacturing the 3D printed object achieves a target capacitance for the 3D printed capacitor.

10. The non-transitory computer-readable data storage medium of claim 8, wherein depositing and selectively fusing the one or more layers of the dielectric agent to form the dielectric region further comprises at least one of:

underfusing a powdered build material between the first electrode and the second electrode;

forming an air pocket between the first electrode and the second electrode; and doping the powdered build material between the first electrode and the second electrode with the dielectric agent.

11. The non-transitory computer-readable data storage medium of claim 10, wherein doping of the powdered build material between the first electrode and the second electrode comprises doping the powdered build material with multiple dielectric agents including the dielectric agent.

12. The non-transitory computer-readable data storage medium of claim 8, wherein the first electrode and the second electrode are vertically oriented within a build area of an additive manufacturing device.

13. The non-transitory computer-readable data storage medium of claim 8, wherein portions of at least one of the slices of the 3D printed object respectively correspond to the first electrode, the second electrode, and the dielectric region, wherein depositing and selectively fusing the one or more layers of the conductive agent comprises depositing the conductive agent on the portions of the at least one of the slices of the 3D printed object that correspond to the first electrode and the second electrode, and wherein depositing and selectively fusing the one or more layers of the dielectric agent comprises depositing the dielectric agent on the portions of the at least one of the slices of the 3D printed object that correspond to the dielectric region.

14. The non-transitory computer-readable data storage medium of claim 8, wherein the dielectric agent deposited in the dielectric region is mixed with a fusing agent prior to selectively fusing the dielectric agent.

15. An additive manufacturing system comprising:

a processor; and a memory storing instructions executable by the processor to perform a processing for additively manufacturing a three-dimensional (3D) printed object comprising:

sequentially depositing and selectively fusing layers of build material to form slices of the 3D printed object; and forming a 3D printed capacitor within a body of the 3D printed object by:

depositing and selectively fusing one or more layers of a conductive agent to form a first electrode and a second electrode of the 3D printed capacitor; and depositing and selectively fusing one or more layers of a dielectric agent to form a dielectric region between the first electrode and the second electrode of the 3D printed capacitor, wherein sequentially depositing and selectively fusing the layers of the build material to form the slices of the 3D printed object also forms a first continuous barrier region between the first electrode and the dielectric region and a second continuous barrier region between the second electrode and the dielectric region, and wherein a degree of fusing is varied in additive manufacturing of the 3D printed object.

16. The additive manufacturing system of claim 15, wherein varying the degree of fusing in additively manufacturing the 3D printed object achieves a target capacitance for the 3D printed capacitor.

17. The additive manufacturing system of claim 15, wherein depositing and selectively fusing the one or more layers of the dielectric agent to form the dielectric region further comprises at least one of:

underfusing a powdered build material between the first electrode and the second electrode;

forming an air pocket between the first electrode and the second electrode; and doping the powdered build material between the first electrode and the second electrode with the dielectric agent.

18. The additive manufacturing system of claim 17, wherein doping of the powdered build material between the first electrode and the second electrode comprises doping the powdered build material with multiple dielectric agents including the dielectric agent.

19. The additive manufacturing system of claim 15, wherein the first electrode and the second electrode are vertically oriented within a build area of the additive manufacturing system.

20. The additive manufacturing system of claim 15, wherein portions of at least one of the slices of the 3D printed object respectively correspond to the first electrode, the second electrode, and the dielectric region, wherein depositing and selectively fusing the one or more layers of the conductive agent comprises depositing the conductive agent on the portions of the at least one of the slices of the 3D printed object that correspond to the first electrode and the second electrode, p1 and wherein depositing and selectively fusing the one or more layers of the dielectric agent comprises depositing the dielectric agent on the portions of the at least one of the slices of the 3D printed object that correspond to the dielectric region.

* * * * *